United States Patent

Buckley et al.

[15] 3,656,986

[45] Apr. 18, 1972

[54] CHROME PIGMENTS

[72] Inventors: Charles Harold Buckley; John Mitchell, both of Manchester, England

[73] Assignee: Imperial Chemical Inudstries Limited

[22] Filed: May 11, 1970

[21] Appl. No.: 36,473

[30] Foreign Application Priority Data

May 12, 1969   Great Britain......................24,086/69

[52] U.S. Cl. ..........................106/302, 106/308 Q, 106/309
[51] Int. Cl. .....................................C09c 1/20, C08h 17/04
[58] Field of Search..............................106/302, 308 Q, 309

[56] References Cited

UNITED STATES PATENTS 3,434,857   3/1969   Seelig....................................106/298

Primary Examiner—Tobias E. Levow
Assistant Examiner—J. V. Howard
Attorney—Cushman, Darby & Cushman

[57] ABSTRACT

Chrome pigments of improved durability, especially to atmospheric sulphurous acid, are obtained by adding to a stirred aqueous suspension of a chrome pigment at an initial pH between 1.8 and 8.0 a source of silicate ions, a source of trivalent antimony ions, and an organic hydroxy acid, and adjusting the pH to between 5 and 10.5 by addition of a water-soluble basic compound.

8 Claims, No Drawings

CHROME PIGMENTS

This invention relates to chrome pigments of improved fastness properties and a method for their manufacture.

According to the invention there is provided a process for the manufacture of improved chrome pigments which comprises adding to a stirred aqueous suspension of a chrome pigment at an initial pH between 1.8 and 8.0 a source of silicate ions, a source of trivalent antimony ions, and an organic hydroxy acid, and adjusting the pH to between 5 and 10.5 by addition of a water-soluble basic compound.

As chrome pigments there are meant chrome yellows such as primrose chromes, lemon chromes, and middle chromes, and molybdenum chromes such as yellow shade molybdenum chromes, middle shade molybdenum chromes and blue shade molybdenum chromes.

The source of silicate ions may be a water-soluble silicate, for example sodium, potassium or ammonium silicate, or may be a compound which breaks down in presence of water to provide silicate ions. It is preferred that the amount of the source of silicate ions should be sufficient to provide silica calculated as $SiO_2$ in amount between 2 and 5 percent of the chrome pigment by weight. The particularly preferred proportion of silica is about 3.5 percent of the weight of pigment. Larger amounts of a source of silicate ions may be used but do not in general provide commensurate improvement in properties.

As a source of trivalent antimony ions there may be mentioned for example trivalent antimony compounds such as antimony trichloride and antimony sulphate. The amount of the source of trivalent antimony ions used should be sufficient to provide antimony calculated as $Sb_2O_3$ in amount from 2 to 5 percent and preferably about 3 percent of the weight of pigment. Larger amounts of a source of antimony ions may be used but do not in general provide a commensurate improvement in properties.

The organic hydroxy acid preferably contains two or more carboxylic acid groups, is preferably an α-hydroxy acid, and is preferably aliphatic. Examples of such acids are glycollic acid, lactic acid, mandelic acid, malic acid, α-hydroxybutyric acid, α-hydroxy-α-methylpentanoic acid, and particularly citric and tartaric acids. The organic hydroxy acid may be added as such or in the form of a water-soluble salt. The amount of organic hydroxy acid used may be from 3 to 10 percent of the weight of chrome pigment, but more can be used if desired.

It is preferred to carry out the final stage of the process of the invention at a pH between 5 and 9, since the use of higher pH does not confer any significant benefit and at pH in the region of 10.5 some decomposition of the pigment may occur. The preferred pH varies with the hydroxy acid used, citric and tartaric acids giving optimum effects at a pH of about 8, while the other acids listed earlier reach their optimum effects at slightly lower pH values.

In contrast to the silicate and antimony ions which remain in the pigment product the hydroxy acids do not appear in the final pigment product to any significant extent but remain in the aqueous medium. Without prejudice to the scope of this invention it is believed that the affect of the organic hydroxy acid is to assist in obtaining a coating of silica and antimony oxide on the surface of the pigment which coating is the cause of the increased fastness in the pigment.

The process may be carried out by mixing aqueous solutions of the silicate, the antimony compound and the organic hydroxy acid with the pigment suspension in any order at an initial pH adjusted to between 2 and 8 and then raising the pH of the mixture to the desired pH by addition of the water-soluble basic compound, for example sodium and potassium hydroxide or carbonate or ammonia.

The pigment products obtained may be used in any conventional manner. For example they may be dispersed in paint media based on natural or synthetic resins such as short oil alkyds, long oil alkyds, formaldehyde/urea condensates, formaldehyde/melamine condensates, acrylic resins or isocyanate-modified alkyds. The paints obtained afford coatings of improved fastness especially to atmospheric sulphurous acid.

The invention is illustrated but not limited by the following examples in which all parts and percentages are by weight unless otherwise stated.

EXAMPLE 1

110 Parts of lead nitrate are dissolved in 500 parts of water at 45° C., the pH is adjusted to 3.0, and the solution is added with stirring over 30 minutes to a solution of 48.8 parts of sodium dichromate and 12.8 parts of sodium hydroxide in 1,600 parts of water at 45° C. The precipitated pigment is washed twice by decantation. Sulphuric acid (about one part is necessary) dissolved in 10 parts of water is added to bring the pH to 1.8 and 11.0 parts of sodium silicate (30 percent $SiO_2$) dissolved in 100 parts of water are added with stirring (the pH rises to about 9.0) followed by a solution of 4.4 parts of antimony trichloride, 4.4 parts of citric acid and 0.4 parts of 36 percent aqueous hydrochloric acid in 22 parts of water. Sodium carbonate (about 4 parts are necessary) dissolved in 40 parts of water is added with stirring to bring the pH to 8.0. The pigment is collected by filtration, washed with water until free from electrolyte and dried at 90° C.

The pigment so obtained is dispersed by grinding in a ball mill with an alkyd/melamine-formaldehyde resin and applied to tin plate panels using a 10/1,000 1,000 inch application and allowed to cure. The panels and panels similarly prepared from pigments not treated as above are marked appropriately and placed in the Canning Apparatus (conforms to B.S.S. 1224/1959) and subjected to the action of moist sulphur dioxide. The coatings containing the treated pigment show superior resistance to sulphur dioxide.

Example 2

122 Parts of lead nitrate are dissolved in 2,400 parts of water at 15° C., the pH is adjusted to 4.0, and the solution is added with stirring over 15 minutes to a solution of 42.3 parts of sodium dichromate, 10.7 parts of sodium hydroxide, 1.5 parts of anhydrous sodium sulphate and 10.5 parts of sodium molybdate in 500 parts of water at 15° C. Nitric acid (about 1 part is necessary) in about 10 parts of water is added with stirring to bring the pH to 2.4 followed by 12 parts of sodium silicate (30 percent $SiO_2$) dissolved in 12 parts of water which raise the pH to about 9.0. A solution of 4.8 parts of antimony trichloride, 4.8 parts of citric acid and 0.5 part of 36 percent aqueous hydrochloric acid in 24 parts of water is added with stirring followed by a solution of 5 parts of aluminium sulphate in 50 parts of water. Sodium carbonate (about seven point five parts are required) dissolved in 75 parts of water is added with stirring until the pH reaches 8.0. The pigment is collected by filtration, washed free from electrolyte, and dried at 90° C.

The pigment so obtained affords a paint having superior resistance to sulphur dioxide than a paint prepared from untreated pigment when tested as described in Example 1.

EXAMPLE 3

A suspension of 50 parts of lead chromate in 600 parts of water is adjusted to pH 2.0 with dilute sulphuric acid and to this are added 6.5 parts of sodium silicate raising the pH to 8-9. Dilute sulphuric acid is added to reduce the pH value to about 3.5 and to the suspension is added a solution of 7.4 parts of maldelic acid, and 2.7 parts of antimony trichloride in 60 parts of N/potassium hydroxide. After stirring for a few minutes to obtain thorough mixing a solution of sodium carbonate in water (10 percent w/v) is added over about 10 minutes until the pH value rises to 8.0. The product is filtered off, washed free from electrolyte, and dried at 70° C.

The pigment obtained has similar fastness properties as that described in Example 1.

EXAMPLE 4

In Example 3 a similar result is obtained if instead of the solution of mandelic acid there is used a solution of 11.3 parts of a 65 aqueous solution of glycollic acid and 2.7 parts of antimony trichloride in 43 parts of 2N sodium hydroxide.

EXAMPLE 5

In Example 3 a similar result is obtained if instead of the solution of mandelic acid there is used a solution of 6.4 parts of malic acid and 2.7 parts of antimony trichloride in 30 parts of 2 N sodium hydroxide.

The malic acid used above can be replaced by 6 parts of lactic acid, 5 parts of α hydroxybutyric acid or 6 parts of α-hydroxy-α-methyl pentanoic acid giving in each case a pigment with similar good fastness properties.

EXAMPLE 6

In Example 2 a similar result is obtained if the citric acid is replaced by 5.0 parts of tartaric acid.

We claim:

1. A process for the manufacture of improved chrome pigments which comprises adding to a stirred aqueous suspension of a chrome pigment at an initial pH between 1.8 and 8.0 a source of silicate ions, a source of trivalent antimony ions, and an organic hydroxy acid, and adjusting the pH to between 5 and 10.5 by addition of a water-soluble basic compound.

2. A process as claimed in claim 1 wherein the pH is adjusted to between 5 and 9 by addition of a water-soluble basic compound.

3. A process as claimed in claim 1 wherein the amount of the source of silicate ions provides silica in amount between 2 and 5 percent of the chrome pigment.

4. A process as claimed in claim 1 wherein the silica provided is 3.5 percent of the weight of chrome pigment.

5. A process as claimed in claim 1 wherein the amount of the source of trivalent antimony ions provides antimony calculated as $Sb_2O_3$ in amount between 2 and 5 percent of the weight of pigment.

6. A process as claimed in claim 1 wherein the antimony calculated as $Sb_2O_3$ provided is 3 percent of the weight of chrome pigment.

7. A process as claimed in claim 1 wherein the amount of hydroxy acid is from 3 to 10 percent of the weight of chrome pigment.

8. A process as claimed in claim 1 wherein the hydroxy acid is an α-hydroxy acid.

* * * * *